(12) United States Patent
Obrador (10) Patent No.: US 6,847,467 B2
(45) Date of Patent: Jan. 25, 2005

(54) METHOD AND APPARATUS FOR LOW MEMORY RENDERING

(75) Inventor: Pere Obrador, Foster City, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 176 days.

(21) Appl. No.: 09/985,082

(22) Filed: Nov. 1, 2001

(65) Prior Publication Data

US 2003/0081233 A1 May 1, 2003

(51) Int. Cl.⁷ .............................................. G06F 15/00
(52) U.S. Cl. .................... 358/1.16; 358/1.17; 358/1.15; 358/404
(58) Field of Search .............................. 358/1.16, 1.15, 358/404, 448, 1.17; 382/299, 305, 240, 248, 239, 237, 302, 243

(56) References Cited

U.S. PATENT DOCUMENTS

| | | | |
|---|---|---|---|
| 5,754,192 A | 5/1998 | Sugaya | |
| 5,758,043 A | 5/1998 | Takizawa et al. | |
| 6,307,974 B1 * | 10/2001 | Tsujimoto | 382/239 |
| 6,507,674 B1 * | 1/2003 | Yagishita et al. | 382/239 |

FOREIGN PATENT DOCUMENTS

EP 1253548 10/2002

OTHER PUBLICATIONS

Pennebaker & Mitchell: "JPEG Still Image Data Compression Standard" 1993, Van Nostrand Reinhold, NY XP002233886 pp. 81–86.

* cited by examiner

*Primary Examiner*—Twyler Lamb (57) ABSTRACT

A method and an apparatus used, for example, in conjunction with a computer or similar device, provides for multi-resolution rendering of image data, where the image data includes background image data, vector data and text data, so as to accommodate memory capacities of rendering devices. The computer may send image data in a multi-resolution format from the computer to one of several rendering devices. The multi-resolution format may be achieved by frequency domain coding or generation of image swaths, or a combination thereof. The image data may first be sent in a low resolution format, and a rendering device determines, based on its memory, whether the corresponding image or text should be rendered. Next, vector data and/or text data may be supplied to the rendering device. Then, higher resolution data may be sent after the text/vector date so as to maximize memory usage of the rendering device. Additionally, in a printing application, the image data may be divided into swaths, with each swath separately provided to a printer.

22 Claims, 12 Drawing Sheets

METHOD AND APPARATUS FOR LOW MEMORY RENDERING

TECHNICAL FIELD

The technical field is rendering images from an image data contained in a digital file.

BACKGROUND

Rendering devices are used to generate an image based on input image data. The input image data may be digital data contained in a file that is stored in a memory, such as a memory associated with a personal computer. Rendering devices may take many forms, and may be portable or essentially fixed. Examples of rendering devices include a cellular telephone, a facsimile machine, a computer with a display, and a printer. The cellular telephone may receive data from a wireless telephone network and may render text and graphical images on a display screen. The facsimile machine may render images and text onto paper or other suitable media. The computer may receive and store the image data and may concurrently, or subsequently, render the image on the display. Printers may receive image data from an attached computer, and may store the image data prior to rendering. Rendering devices used in connection with personal computers, or other computers and similar devices, are capable of rendering images and text either as bit map data or line drawing images. Image data supplied to the rendering device may be photograph data from a digital camera, data generated by a computer graphics package, or simply text data generated, for example, by a word processing program. Printers used to render the image data may be large format printers capable of printing posters, architectural images, and other large images. The printers may also include more common laser printers and ink jet printers.

In the specific case of a printer, print data received by the printer from a computer may include bit map data specifying an image in the form of a bit map, vector data specifying features in terms of vectors, and text data specifying text characters. For example, an architect's printing requirements may include a background photograph showing a building site, and superimposed, a computer generated image of a building having rendered texture and tones. The architect's image may also contain arrows and text pointing to individual features on the building, with the arrows and text superimposed either over the computer generated image or the background photograph.

However, many rendering devices do not have enough memory capacity to store an entire image to be rendered. As a result, the image to be rendered may be rendered with data missing, such a broad white stripe running the length of the image, for example.

SUMMARY

A rendering system used, for example, in conjunction with a computer or similar device, provides for multi-resolution rendering of image data, comprising background image data, vector data and text data, so as to accommodate memory capacities of rendering devices in the rendering system. The computer may send the image data in a multi-resolution format from the computer to one of several rendering devices coupled to the rendering system. Background image data may first be sent in a low resolution format, and the rendering device determines, based on a memory capacity of the rendering device, whether the corresponding image or text should be rendered. Next, vector data and/or text data may be supplied to the rendering device. In this way, the rendering device initially receives low resolution background image data together with vector data and text data for any vectors or text that overlay the image data. Finally, the computer sends refined image data in a high resolution format. In an embodiment, sending the high resolution image data may occur over several iterations, with each successive iteration providing higher resolution data.

In an embodiment, the rendering device is a printer that receives low resolution background image data followed by the vector data and/or the text data, and stores the received data in memory. Because the background image data is in a low resolution format, the printer does not need a large amount of memory to store the background image data along with the vector and/or text data. The printer then receives refined background image data in a high resolution format. Depending on the amount of available memory, the printer may store the refined, high resolution image data. In an embodiment, the printer accumulates higher resolution image data until the capacity of the printer's memory is reached, at which point the printer combines the lower resolution image data with the higher resolution image data in order to render the image. Depending on the printer memory, the highest resolution image file is stored, and printing of the image data includes the highest resolution image data. For printers having a lower memory capacity than that required to store the highest resolution image data, printing may proceed based on intermediate resolution image data, and any vector and/or text data.

In an alternative embodiment, and as applied to specific printer types, a printer driver in the computer may send the printer only as much print data as can be stored in the printer memory. In another embodiment, the computer may break the print data into a series of swaths or bands, with each swath representing a portion of the print data. A first swath of the print data may include image data, vector data, and text data that would be printed in a specified height on a printing medium. For example, when printing on a standard 8½×11 page, the first swath may represent the first two inches of the page. The print data for the first swath may be stored in the printer memory, and that portion of the print data may be used to print an image portion on the page. The print data are then discarded from memory, and the computer sends print data for the next swath to the printer. This process continues until the entire page is printed.

In yet another embodiment, the printer system uses a combination of printing by swaths, and multi-resolution printing within one or more of the swaths, to provide the highest possible image resolution and to maximize use of the printer memory.

DESCRIPTION OF THE DRAWINGS

The detailed description will refer to the following drawings in which like numerals refer to like elements, and in which.

DETAILED DESCRIPTION

Figure 1A:
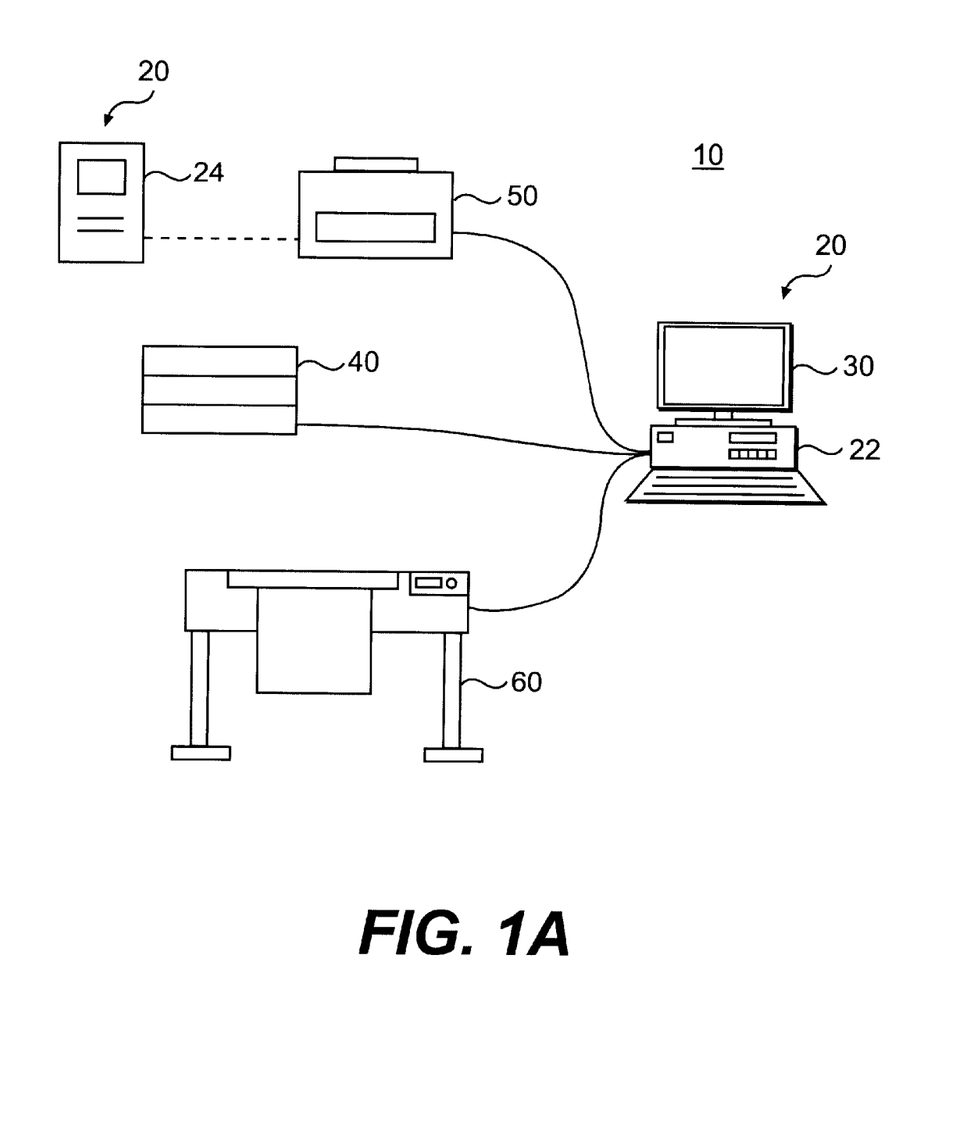
FIGS. 1a–1b illustrate a system that uses multi-resolution rendering.

FIG. 1a illustrates a system 10 adapted for multi-resolution rendering as a solution for low-memory rendering devices. The system 10 includes an image data source 20, which may be a personal computer 22 or a wireless device 24, and a plurality of rendering devices, including a computer display 30, a laser printer 40, an ink jet printer 50, and a large format printer 60. The wireless device 24 and the personal computer 22 may communicate with any and all of the plurality of rendering devices, and may send image data to any and all of the plurality of rendering devices in order to render images and text. The wireless device 24 may be a wireless computer, a personal data assistant, or a cellular telephone, for example. Furthermore, a display on the wireless device 24 may also be a rendering device within the system 10. The personal computer 22 may be coupled to any and all of the plurality of rendering devices by an appropriate cable connection. The system 10 may be part of a larger networked computer system in which several personal computers are connected to a central server (not shown) and in which the personal computers share resources, including the plurality of rendering devices.

Individual rendering devices may have different memory capacities. For example the ink jet printer 50 may have a data storage capacity of 64 MegaBytes in RAM, the laser printer 40 may have a storage capacity of 128 MegaBytes in RAM, and the large format printer 60 may have a data storage capacity of 20 GigaBytes in a hard drive. The description that follows will refer to a printing system as an exemplary embodiment of low-memory rendering. However, those of ordinary skill in the art will recognize that similar techniques may be used with rendering devices other than printers.

Figure 1B:
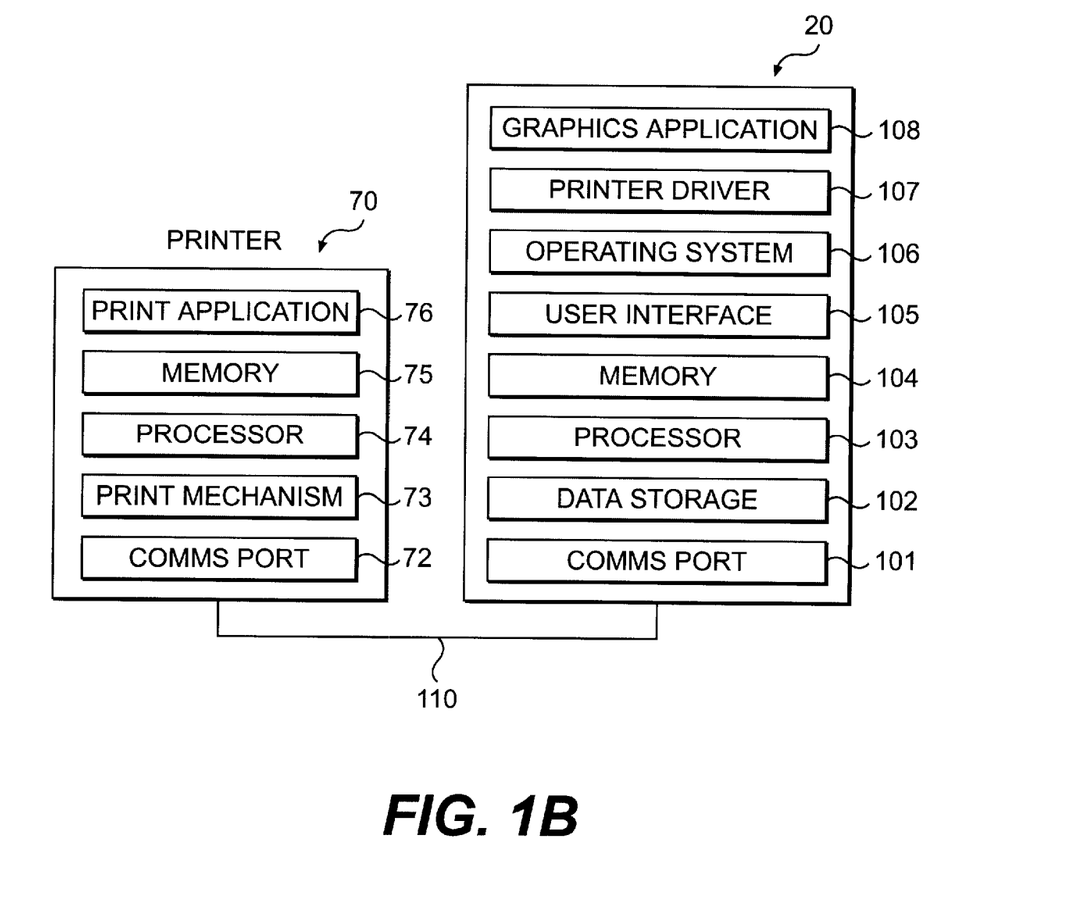

FIG. 1b illustrates a printer 70 and corresponding image data source 20, for example the personal computer 22. The printer 70 includes a communications port 72, a print mechanism 73, a processor 74, a memory 75, and a print application 76. The image data source 20 includes a communications port 101, a data storage device 102, which may be a hard drive, a processor 103, a memory area 104, a user interface 105, which may include a video monitor, keyboard, and pointing device, an operating system 106, a printer driver 107, and an applications program 108. The printer 70 and the image data source 20 may communicate using a local area network cable 110.

The printer 70 operates the print application 76 written in a known printing language such as Hewlett-Packard Graphics Language 2 (HPGL2), which is capable of handling bit maps and vectors, or HP Raster Transfer Language (HPRTL), which is capable of receiving bit map data in rasterized form. The print application 76 converts the print data into a form in which the print mechanism 73 can produce a printed image.

Image data, and in particular image data sent by the image data source 20, may be sent to the printer 70 without the print data source having any knowledge of the memory capacity of the printer 70. The image data so transferred may be layered, and each layer of the image data may be sent from the image data source 20 to the printer 70 as successive digital data files of increasing higher resolution. That is, the image data source 20 may sample the image data at different resolutions, with each such sample comprising a resolution layer, and the successive resolution layers are then sent to the printer 70. The image data sent to a printer 70 will be the same, regardless of the memory capacity of the printer. For example, and referring to FIG. 1a, the personal computer 22, as the image data source 20, will send the same data, in the same resolution layers to each of the printers 40, 50, and 60, even though the memory capacity of the printers 40, 50, and 60 is different. As a result, the format of the image data sent from the image source 20 can remain fixed, regardless of the image data destination.

The system 10 shown in FIG. 1a may be used to render images of acceptable quality by rendering a subset of image data corresponding to a background image of the image to be rendered, rendering text and/or vector data of the image to be rendered, and, depending on memory capacity of the rendering device, rendering additional image data corresponding to the background image. To accomplish this low-memory rendering, the data corresponding to the image to be rendered may be divided according to a first rule to produce multiple first data segments. Each of the first data segments may then be divided according to a second rule to provide multiple second data segments. The first rule may generate multiple swaths as the first data segments and the second rule may produce multi-resolution levels for each of the swaths. In the rendering device, each swath is then rendered using a multi-resolution rendering method. In an embodiment, only the multi-resolution data segmentation is performed. The multi-resolution and swath methods will be described below.

Figure 2A:
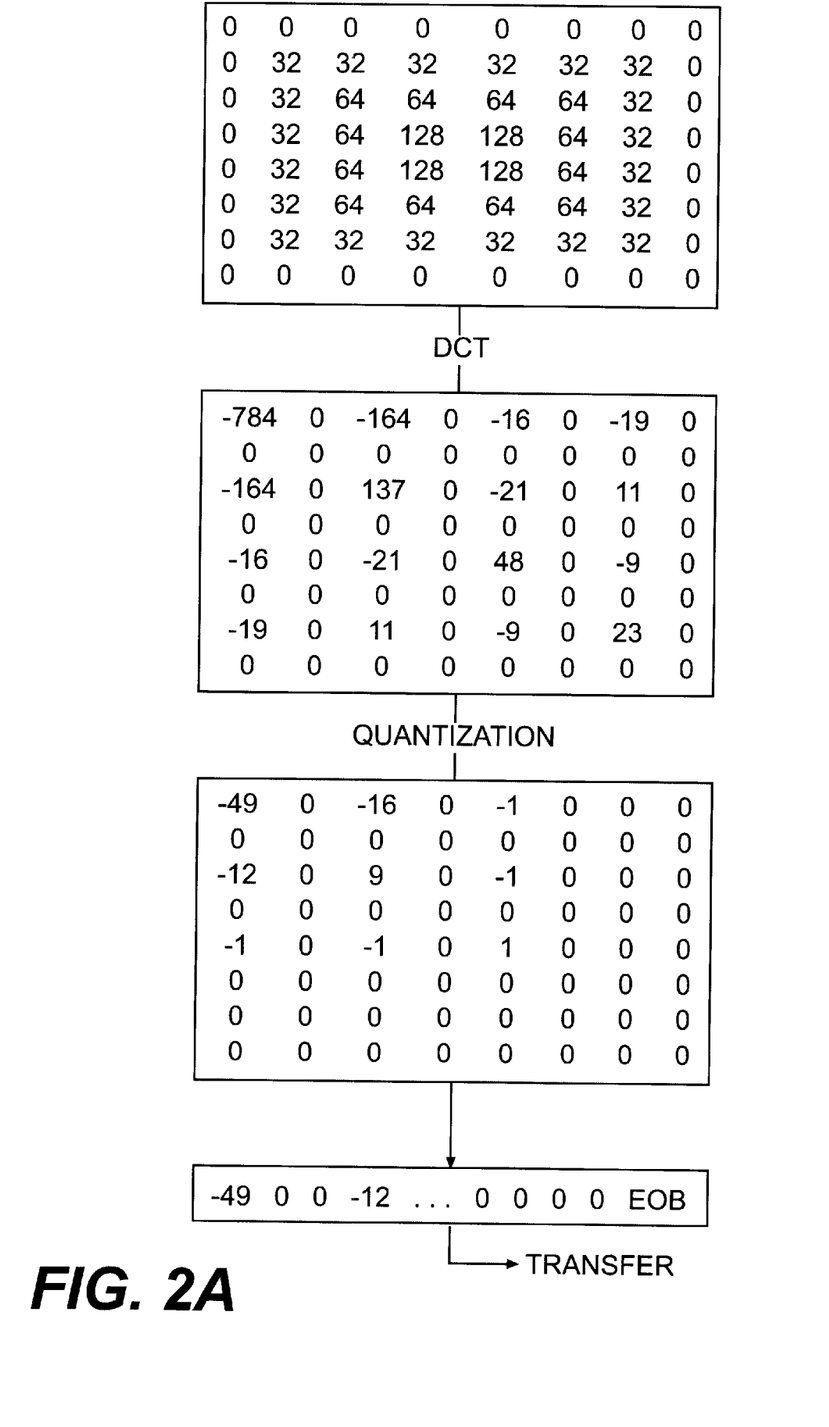
FIGS. 2a–2c illustrate a conceptual model and process for multi-resolution coding to be used for low-memory rendering.
Figure 2B:
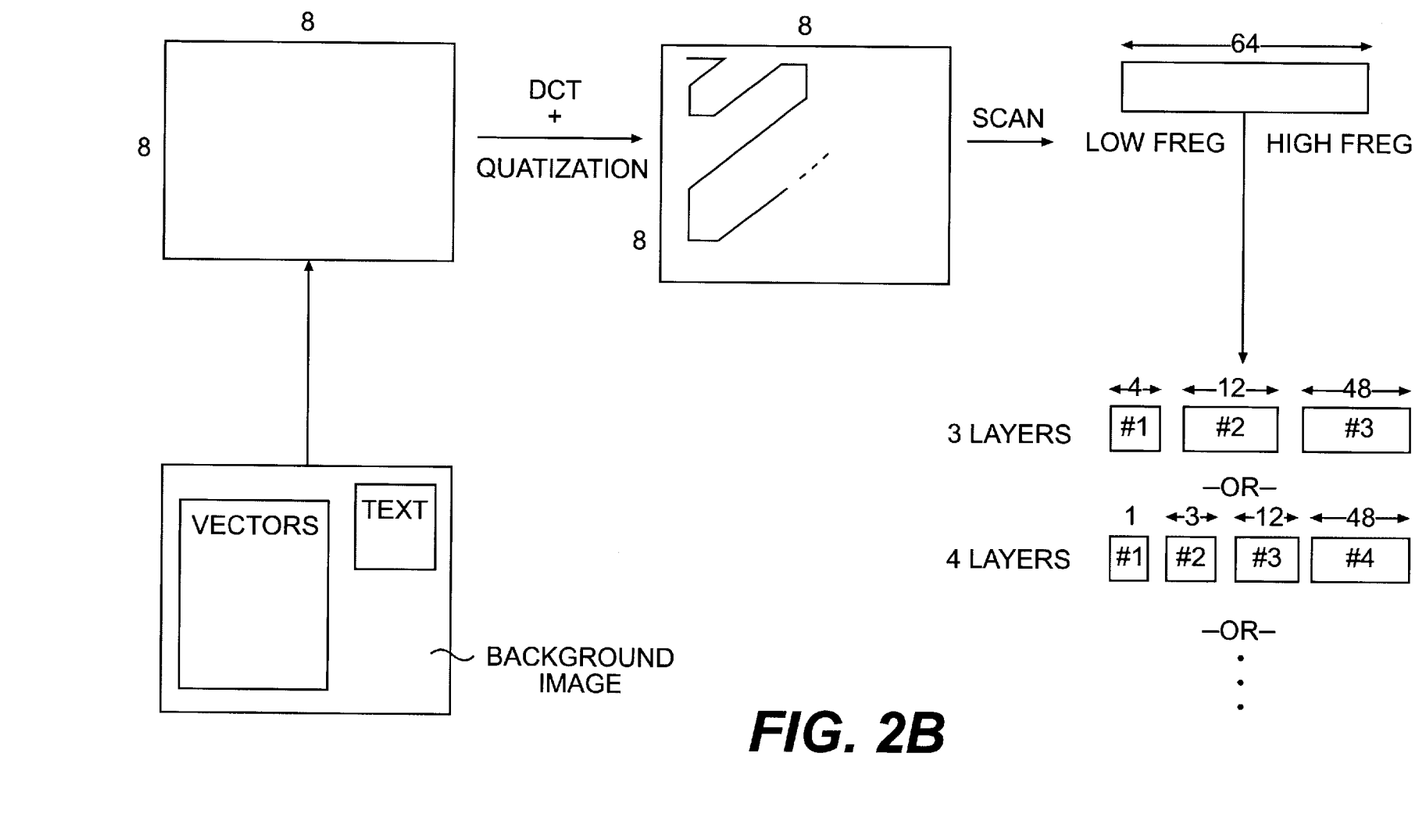
Figure 2C:
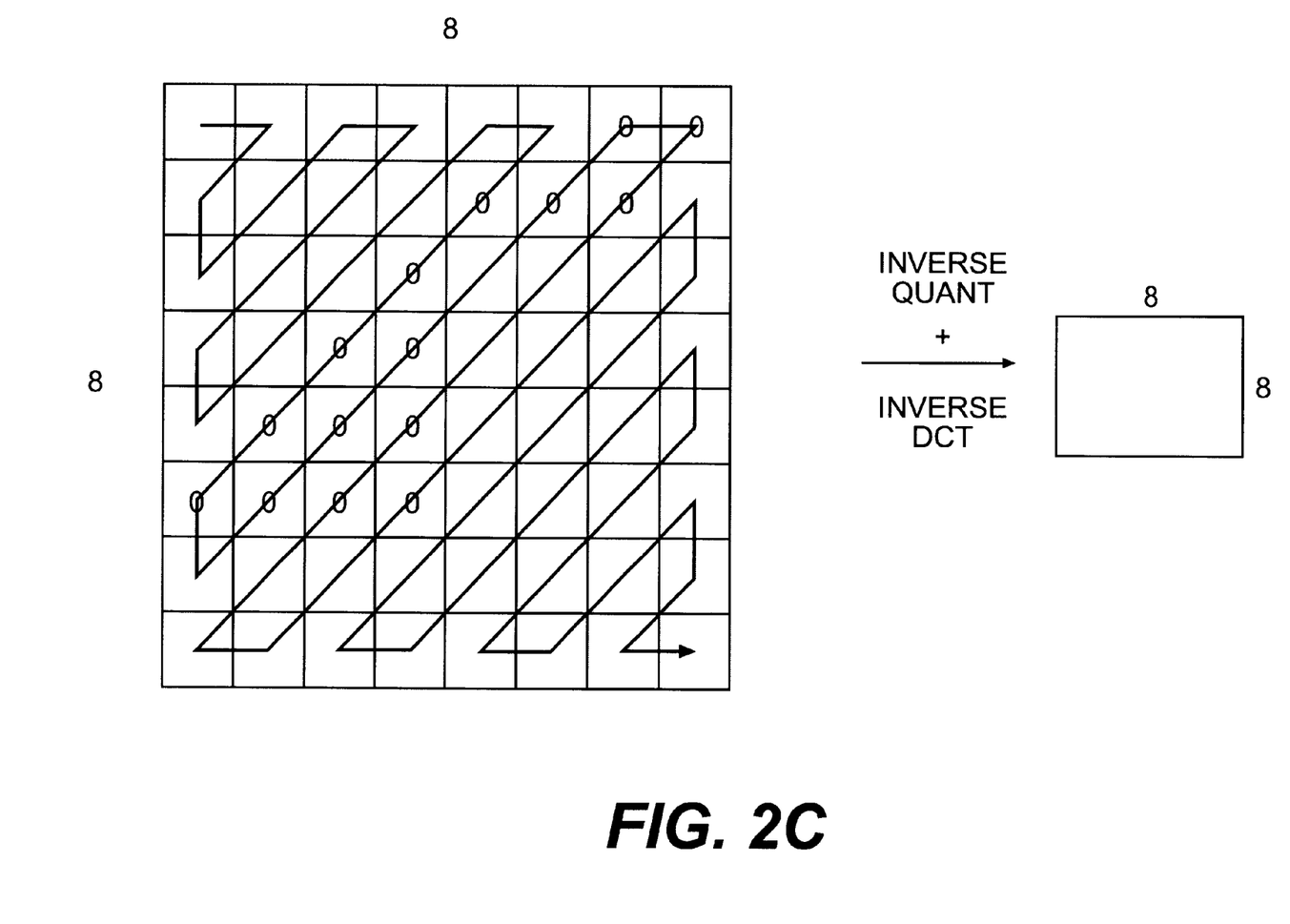

FIGS. 2a–2c illustrate a conceptual model of multi-resolution coding using frequency domain compression. Such a multi-resolution coding scheme may be used to improve the speed and efficiency of printing when using a low memory printer. The conceptual model shown in FIGS. 2a–2b relies on JPEG discrete cosine transformation (DCT) coding. However, other frequency-domain coding schemes may also be used to enhance printing efficiency, including wavelet coding and region-based subband coding.

In FIG. 2a, the coding scheme uses JPEG DCT coding for processing 8×8 blocks of pixels from an image bitmap to form an encoded image that may be transmitted to a print device for decoding and printing. The encoding process begins with a DCT step that transforms a two-dimensional block of pixels from the spatial domain to a two-dimensional array of frequency coefficients in the frequency domain. The DCT step decorrelates the 64 image pixels in the 8×8 pixel block and concentrates most of the pixel's energy into coefficients in the top left corner of the frequency array, leaving the remaining pixels with near-zero values. Among the frequency coefficients, the DC coefficient represents the average intensity value of the 64 pixels in the spatial domain. The other coefficients represent spatial features occurring at different frequencies in the 8×8 block of pixels. Within the frequency coefficient array, the lowest frequency coefficients are located in the upper left and the highest frequency coefficients in the lower right. The DCT step is a lossless operation because, if the coefficients are represented with sufficient accuracy, the 8×8 block of pixels can be recovered exactly.

The next step is quantization, a lossy operation that drives small, nonessential frequency components to zero by scaling each frequency coefficient to the nearest multiple value found in a quantization table. A zig-zag sequence is used to read out the quantized frequency coefficients into a one-dimensional array in preparation for transmission to the print device. This sequence orders the frequency coefficients from lowest to highest, allowing further encoding to be applied for efficient transmission to the print device.

Upon receipt at the print device, such as the printer 70, a decoder in the print device, using the same quantization table as that used in the encoding device, dequantizes the quantized coefficients. An inverse DCT step is then performed to approximately recreate the 8×8 blocks of pixels.

The JPEG DCT coding scheme may be implemented in a hierarchical manner, providing progressive coding with increased spatial resolution between successive stages. Thus, the image to be printed is encoded at multiple resolutions so that lower-resolution versions may be transmitted to the print device and printed without having to decompress the image at its full resolution.

As noted above, other frequency coding schemes may be used to enhance low-memory printing. Wavelet coding uses localized basis functions to break down an image into its essential details. Using short-duration waves, rather than a continuous sinusoid as in DCT coding, wavelet coding can more efficiently represent small features in an image, such as rapid transitions that occur at an edge of an object. In addition, wavelet coding allows for full image encoding, rather than the 8×8 block encoding structure used by DCT transform coding. These advantages allow wavelet coding to provide higher compression ratios for a given image quality.

Yet another coding scheme is region-based subband coding (RBSSC), described in detail in "A region-based subband coding scheme," by Joseph Casas and Luis Torres, which is hereby incorporated by reference.

FIG. 2b illustrates the concept of JPEG DCT coding as a solution to low-memory rendering. An initial image to be rendered comprises a background image, vectors, and text. The background image may be divided into 8×8 blocks of pixels. Each of the 8×8 pixel blocks is then subject to frequency transform coding, such as, for example, completing discrete cosine transform and quantization steps. The thus-transformed 8×8 pixel block is zig-zag scanned to produce a one-dimensional array of transform coefficients, arranged from lowest frequency to highest frequency. Next, the array of transform coefficients is divided into one or more packets, depending on the number of resolution levels or layers desired. For example, if three resolution levels will be used, a first packet comprising the four lowest frequency coefficients is constructed. A second packet comprises the next twelve coefficients. A third packet comprises the final 48 and highest frequency coefficients. If four resolution levels will be used, four packets comprising 1, 3, 12 and 48 coefficients are assembled. Other arrangements of coefficients can be used for more resolution levels.

Once the packets are constructed, for each of the 8×8 pixel blocks, the first resolution level is sent to the rendering device (e.g., a display, printer, facsimile). Next, any vector and text data are sent to the rendering device. Then, subsequent resolution layers are sent to the rendering device. If a memory capacity of the rendering device is reached upon receipt of the first resolution level and the vector and text data, the rendering device may still render an acceptable image. If the memory capacity is not reached after receipt of the first resolution level and the vector and text data, the rendering device may receive the subsequent resolution level background image data, and may combine the data to produce a refined background image.

FIG. 2c shows an inverse transform operation at the rendering device. In the illustrated example, the first and second of three resolution levels have been received at the rendering device before the memory capacity of the rendering device is reached. That is, only the first 16 lowest frequency transform coefficients are received at the rendering device as shown. The received transform coefficients are arranged in an 8×8 block, with zeros representing non-received coefficients. The coefficients are then decoded using inverse quantization and inverse DCT steps to produce an approximation of the original 8×8 pixel block.

Alternatively, the original image may be deconstructed into one or more sub-images, or swaths, and the coding and inverse coding processes may be completed for each such swaths.

Figure 3A:
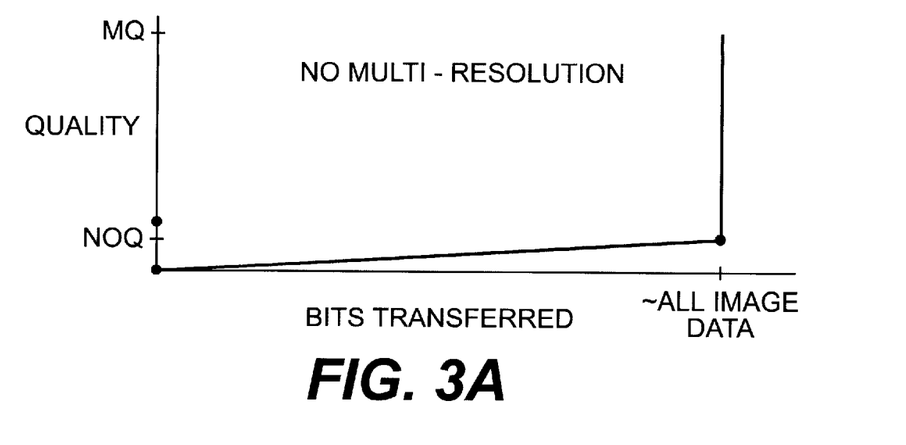
FIGS. 3a–3c illustrate a relationship between image quality and bitmap transfer.
Figure 3B:
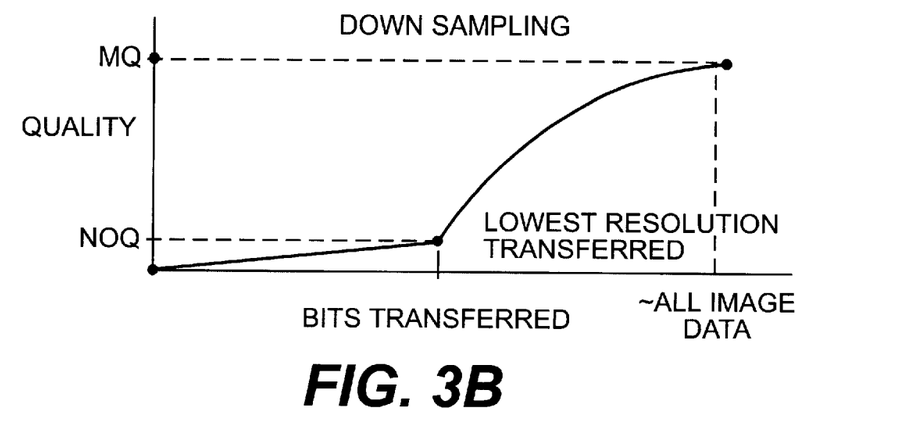
Figure 3C:
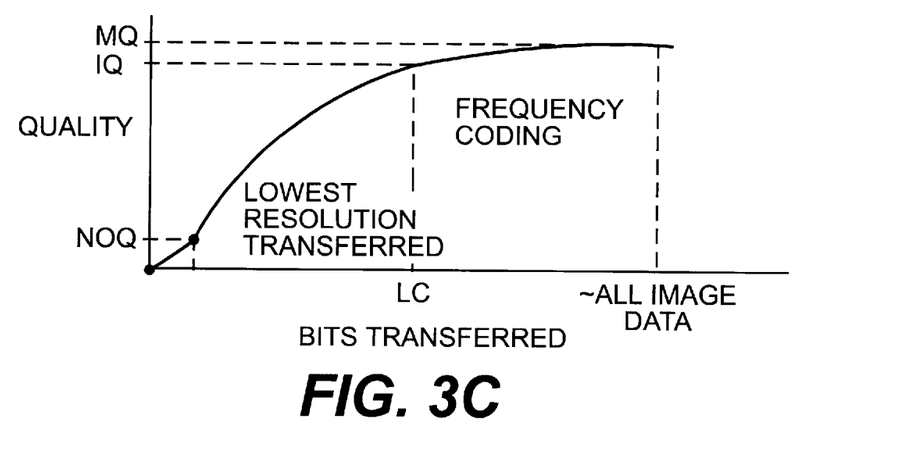

FIGS. 3a–3c illustrate the effect of downsampling (which is explained in detail in U.S. patent application, Ser. No. 10/134,301 entitled "Multi-Resolution Printing," which is hereby incorporated by reference) and frequency coding on the image rendering process. In each of FIGS. 3a–3c, the horizontal axis represents the number of bits or coefficients (data) that are sent to a rendering device, such as the printer 70. The vertical axis represents the Human Visual System Picture Quality. A first, or minimum quality threshold may be specified to ensure the print quality is acceptable. Unacceptable print quality may occur when less than the entire bitmap can be printed, resulting, for example, in white stripes in the printed image due to non-receipt of image data. A situation in which no white stripes are visible may be referred to as the No Objection Quality (NOQ) level. After the NOQ level is achieved, the rate at which image quality increases (to an Intermediate Quality (IQ) level and thence to a Maximum Quality (MQ) level) depends on how the bitmap is sent to the rendering device.

Referring to FIG. 3a, a printing operation with no multi-resolution coding and no downsampling is shown. In this case, the NOQ and MQ levels are obtained at the same time, specifically when the entire image bitmap is received at the printer 70. Any image data (bitmap) transmission with fewer bits will result in objectionable quality levels.

FIG. 3b shows the effect of downsampling. In this case, once the first (lowest) resolution set of data is received at the printer 70, the image may be rendered without any white stripes. Thus, the NOQ level is achieved when the lowest resolution layer is received at the printer 70. Subsequent to reception of the lowest resolution layer, additional resolution layers received at the printer 70 provide increasing image quality up to the MQ level.

FIG. 3c shows the effect of frequency domain coding. In this case, NOQ is reached much sooner due to the compression (e.g., JPEG DCT or other transform domain compression). After the NOQ level is achieved, image quality increases very rapidly to close to the MQ level. At a point in the bitmap transmission (designated IQ) the image quality is as good as can be achieved (because of the inherent lossy nature of the quantization algorithms used in transform coding), and a very high quality image is possible with only the IQ bits received at the printer 70.

Figure 4:
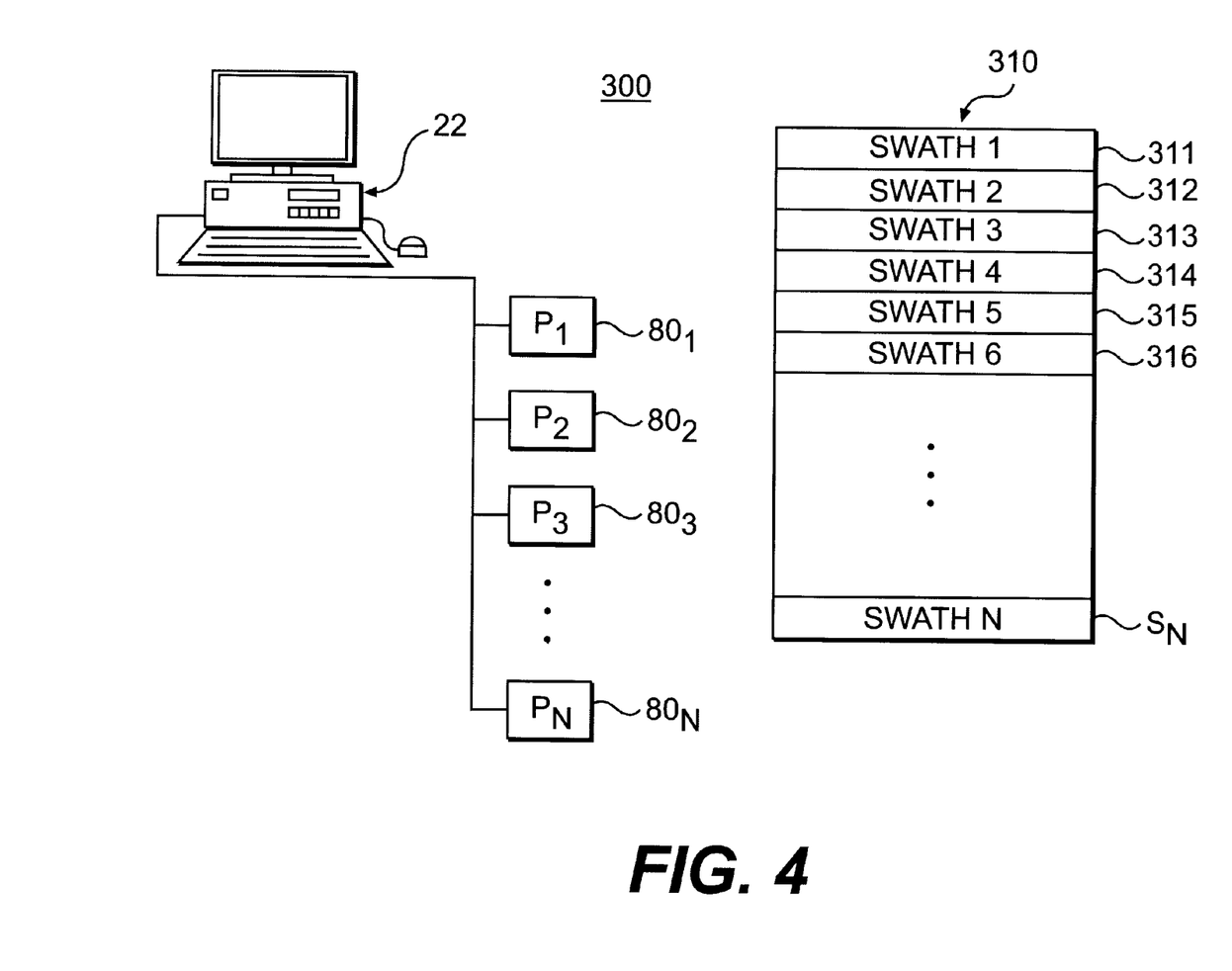
FIG. 4 illustrates an alternative approach to low-memory rendering.

FIG. 4 illustrates a conceptual model of swath construction 300 that may be used for multi-resolution printing using low-memory printers. The image data source (represented in FIG. 4 as the personal computer 22) is coupled to a plurality of printers $80_i$. Each of the printers $80_i$ may have a different memory capacity. Some of the printers $80_i$ may store print data (including image data) in RAM. Other printers $80_i$ may store print data in a hard drive, for example. The personal computer 22 may divide, or deconstruct, an image 310 to be printed into a plurality of swaths, with each swath comprising a fixed "height" of the image. Thus, the image 310 may be deconstructed into swaths 311-N. For example, the image 310 may be deconstructed into 10 swaths, each representing a one-inch "height" of the image 310. The personal computer 22 may then send each of the swaths 311-N to the printers $80_i$ in a successive fashion. That is, the personal computer 22 may send the swath 311 to the printers $80_i$, followed by the swath 312, and so on until all the swaths 311-N are sent.

In an embodiment, each of the printers $80_i$ will receive the swaths 311-N and will attempt to store the swaths in memory. However, if a memory capacity of a particular printer $80_i$ is reached before all the swaths 311-N are received and stored, that printer $80_i$ may begin printing the stored swaths, thereby freeing memory to store the remaining swaths. In an alternative embodiment, each of the printers $80_i$ will immediately begin printing a received swath once the received swath is stored in memory. The thus-printed swath may then be discarded from memory. The process continues until all swaths are received, stored, printed, and discarded.

In another embodiment, the concepts illustrated in FIGS. 2a–2c and 3c may be combined with the swath construction 300. In this embodiment, the image data source 20 deconstructs an image to be printed into a plurality of swaths. Then, for each such swath, the image data source 20 completes a frequency transform operation, such as JPEG DCT coding, for example. Each swath of the image is then transferred, as a series of increasingly higher resolution layers, to a printer. The printer stores each of the swath resolution layers until a memory capacity of the printer is reached. When the memory capacity is reached, the transferred data are combined, and a swath is printed. The image data for the thus-printed swath is then discarded from memory. The image data source 20 then sends the next successive swath to the printer, again in a frequency compressed coding scheme. This process continues until the entire image is rendered by the printer.

In the description provided above with respect to FIG. 4, only background image data was frequency encoded prior to transfer from the image data source 20 to the printer. However, as also noted above, an image to be rendered may include vector data and text data, for example. In the event that vector data and text data accompany the image data, such vector data and text data may be transferred to the rendering device after at least a minimum resolution layer of the background image data are transferred. Alternatively, the vector data and the text data may be transferred before the background image data is transferred.

Figure 5:
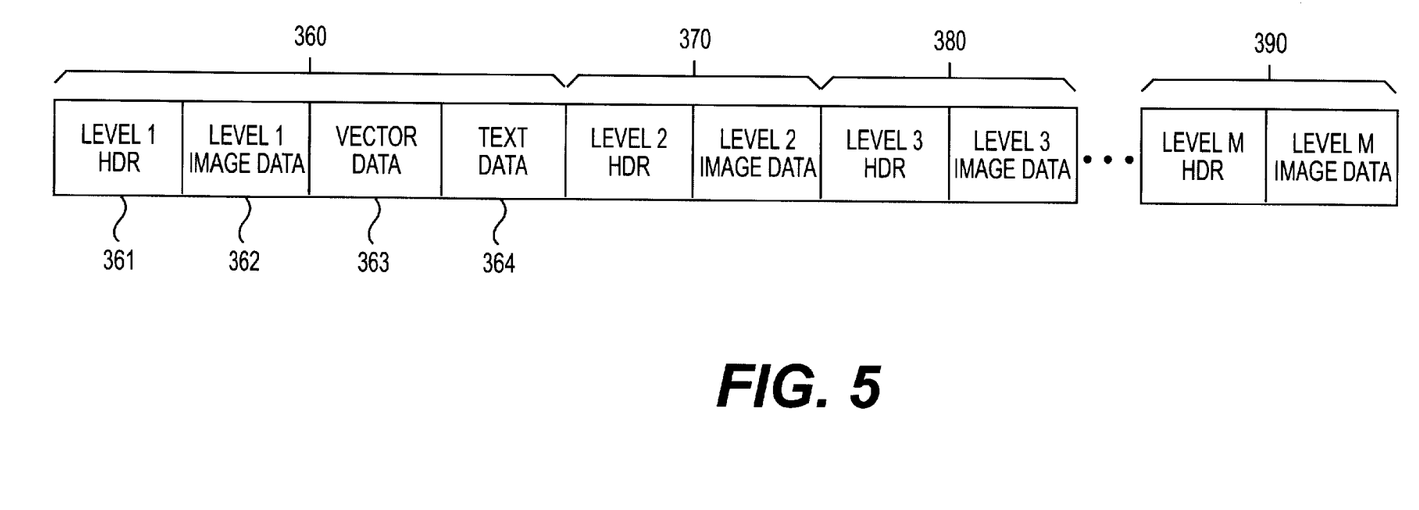
FIG. 5 illustrates schematically an image data file.

FIG. 5 illustrates schematically an image data file 350 that may be transmitted from the image data source 20 to a rendering device, such as the printers $80_i$ of FIG. 4. The file 350 includes a number of image data resolution files, such as files 360, 370, 380 and 390. Each of the files 360, 370, 380 and 390 in turn comprises a number of files. For example, the file 360 comprises a level 1 data header file 361, which indicates that data related to the first resolution layer will follow; a data field 362 comprising transform coefficients for the first resolution layer; a vector data field 363 comprising any vector data associated with the image; and a text data field 364 comprising text data for the image. The vector data in the vector data field 363 and the text data in the text data field 364 may, when printed, overlay the background image data. Subsequent resolution layer files may be constructed in a manner similar to that of the file 310.

Returning to FIG. 4, in the illustrated system 300, an image to be printed may be deconstructed into the swaths 311-N, assuming that a particular printer $80_i$ will be capable of storing all print data associated with a particular swath. That is, the image data source 20 may have prior knowledge of the minimum memory of attached printers, and the image data source 20, when constructing the swaths, will structure the swaths such that each of the printers $80_i$ is capable of storing all data related to the particular swath. In an alternative embodiment, the image data source 20 has no prior knowledge of printer memory capacity, and so constructs the swaths according to a set rule. The set rule may be based on average memory in most common printers, a lower limit on a range of available printer memory, or other rules.

The above-described embodiments of low-memory rendering methods and devices maximize memory usage of a rendering device. In particular, the embodiments allow the rendering device to render a background image having an acceptable quality level, and to also render text and vector data. The quality of the background image may be improved for rendering devices having larger memory capabilities.

Figure 6:
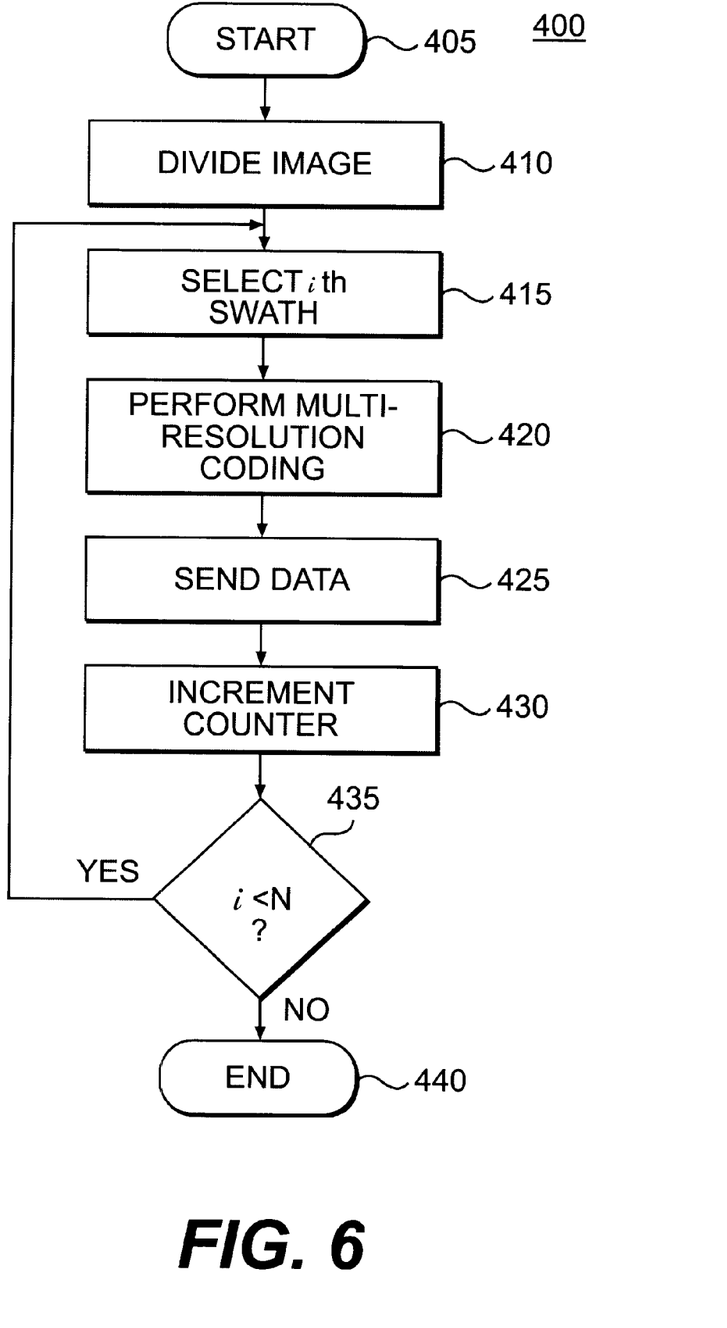
FIGS. 6–9 are flowcharts illustrating processes for low-memory rendering.

FIG. 6 is a flowchart illustrating a process 400 that may be carried out to provide multi-resolution printing with low-memory printers. The process 400 may be carried out using the system 10 shown in FIG. 1a, with an image being deconstructed into swaths according to FIG. 4 and layers within swaths according to FIGS. 2a–2c.

The process 400 begins with start block 405. In block 410, the personal computer 22 receives an image to be printed, and deconstructs the image into N swaths. The image to be printed may comprise image data, vector data and text data, with the vector and text data overlaying the image data, for example. Alternatively, some or all of the vector data and/or some or all of the text data may be included in an area of the image that does not overlay the image data. In deconstructing the image to be printed into N swaths, the personal computer 22, executing the process block 410, may use a height of the image to be printed to determine the "height" of each of the N swaths. Alternatively, the personal computer 22 may determine a data density of the image to be printed, and may adjust the "heights" of each of the N swaths according to a nominal or a known memory capacity of printer that may print the image to be printed. The personal computer 22 may determine the data density by, for example, scanning the image, reading data density information from a file accompanying the image to be printed, or by other means. When setting the swath "height," the personal computer need not make the "heights" of each of the N swaths equal.

In select swath block 415, the personal computer 22 selects the $i^{th}$ swath, starting with the first swath of the image to be printed. The first swath may typically be a swath located at a top of the image to be printed. In multi-resolution coding block 420, the personal computer 22 executes a sub-routine 420 to transform the background image data of the $i^{th}$ swath into the frequency domain. Such a frequency encoding routine is described in detail with reference to FIG. 8.

Figure 9:
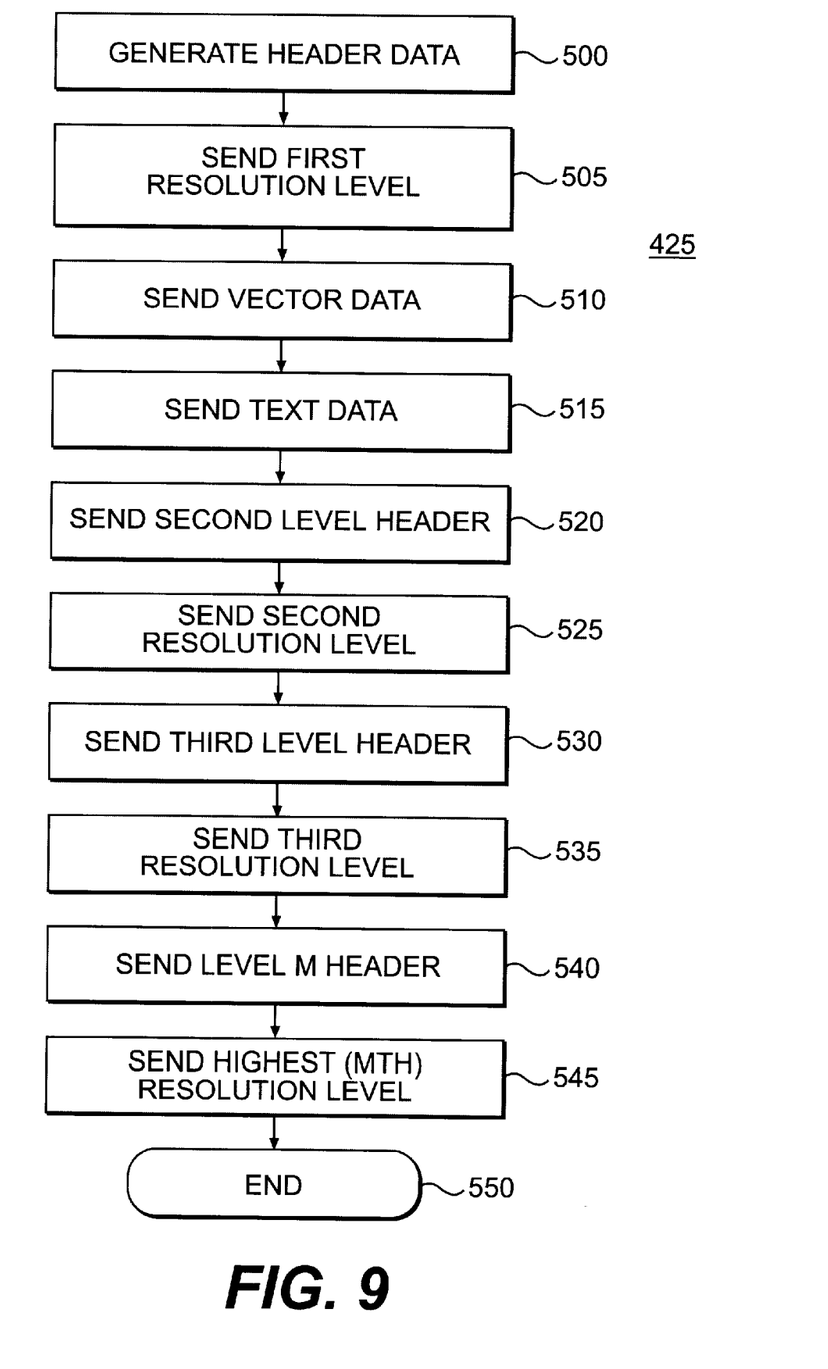

In send data block 425, the personal computer 22 transfers print data associated with the $i^{th}$ swath to one or more printers that may be coupled to the personal computer 22. In an embodiment, the print data associated with the $i^{th}$ swath may be transferred after all resolution layers are constructed. Alternatively, the print data associated with the $i^{th}$ swath may be transferred one resolution layer at a time. If the $i^{th}$ swath includes only one resolution layer, then the print data associated with the $i^{th}$ swath may be transferred as soon as the N swaths are created. FIG. 9 shows the send data subroutine 425 in more detail.

In increment counter block 430, the personal computer 22 may increment a counter to advance the swath number by one increment. In block 435, the personal computer 22 determines if the thus-incremented value of i equals N. If the values equal, the process 400 proceeds to block 440 and ends. Otherwise, the process 400 returns to block 415, and the next swath is selected.

Figure 7:
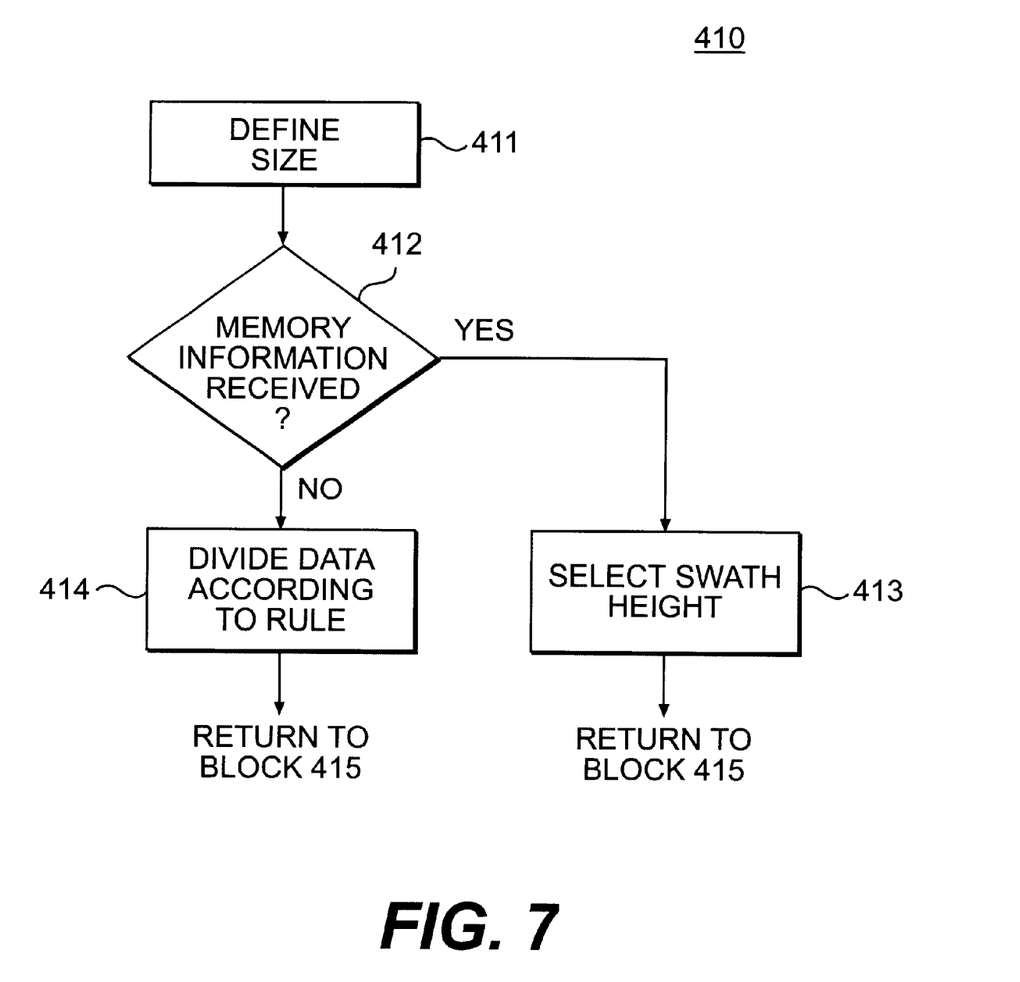

FIG. 7 is a flowchart illustrating the subroutine 410 for dividing the image to be printed into swaths. In block 411, the personal computer 22 determines a size of the image to be printed. In an embodiment, the personal computer 22 determines overall dimensions (height and width in inches, for example) of the image to be printed, as the image will appear when rendered onto a print medium. The personal computer 22 may also determine data density of the image to be printed (for example, the number of pixels in the image, vector data and text data). In block 412, the personal computer 22 determines if any printer that is designated to print the image has provided memory capacity information. If memory capacity information has been provided, the subroutine 410 may proceed to block 413, and select a swath "height" based on the provided memory capacity information. The subroutine 410 then ends, and processing returns to the main routine 400 for multi-resolution printing.

In block 412, if the personal computer 22 determines that memory capacity information has not been provided, then processing may proceed to block 414, and the swath "height" may be selected based on a pre-defined rule. For example, the pre-defined rule could specify that each swath should have a "height" corresponding to one (1) inch of vertical height of the image to be printed. The subroutine 410 then ends.

As noted above, each of the N swaths determined in block 410 may be further resolved into a number of resolution layers. Alternatively, the entire image to be printed may be resolved into a number of resolution layers, and no swaths would then be constructed.

Figure 8:
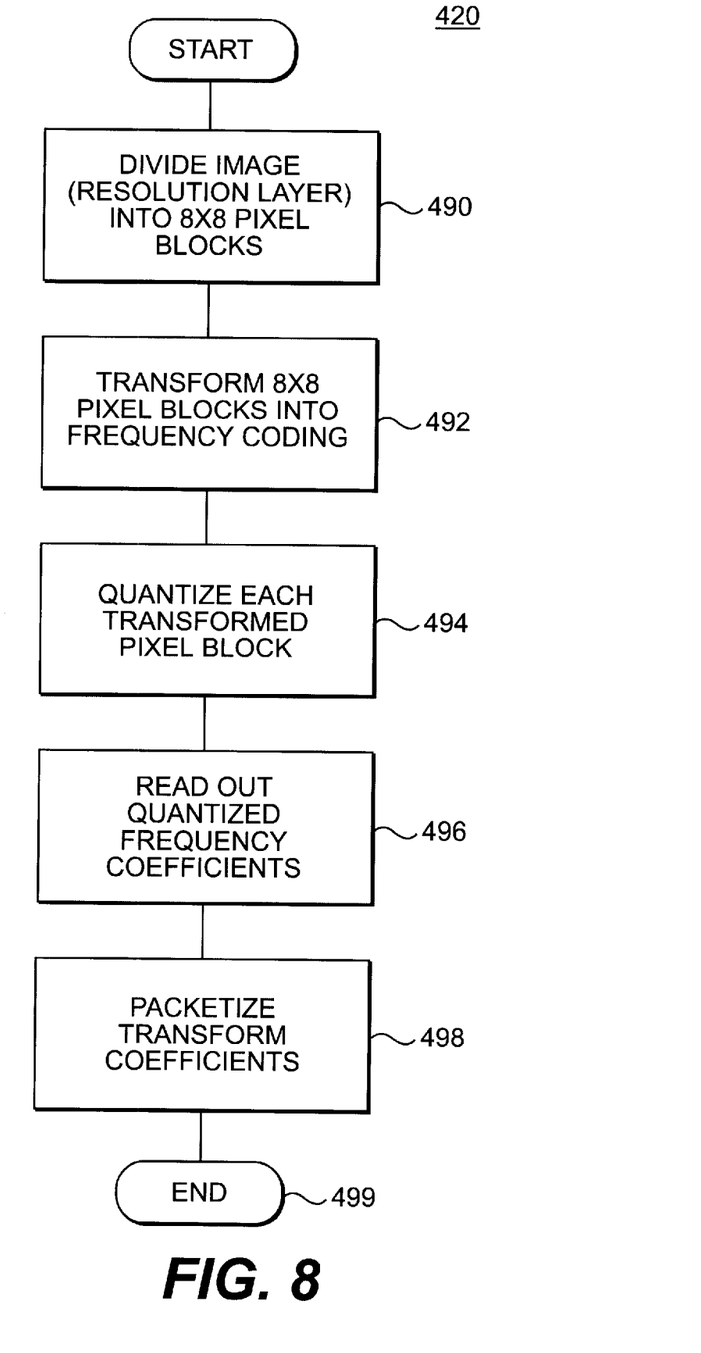

FIG. 8 illustrates the frequency coding sub-routine 420 that may be used to encode an entire image bitmap, or to encode each swath of the image. The sub-routine 420 begins by dividing the image (or resolution layer or swath) into 8×8 pixel blocks (block 490). In block 492, each of the 8×8 pixel blocks is transformed into the frequency domain by using a JPEG DCT coding scheme. Next, in block 494, each of the transformed 8×8 pixel blocks is quantized using a JPEG standard quantization table. In block 496, the quantized frequency coefficients are read out into a one-dimensional array in preparation for transmission from the image data source 20. In block 498, the array of transform coefficients is packetized according to the number of resolution levels desired. The sub-routine 420 then ends, block 499, and processing returns to block 425.

FIG. 9 is a flowchart that illustrates the send data sub-routine 425. In block 500, a first level header data is generated, containing data specifying that a multi-resolution format will follow, and specifying the first resolution level (i.e., resolution layer 1). In block 505, the first level image data is sent from the personal computer 22, comprising the first level of frequency coefficients. In block 510, vector data is sent in a vector field. In block 515, text data describing any text additions to the image is sent in a text data field. In block 520 second level header data is sent indicating second resolution level image data (i.e., frequency coefficients) will follow. In block 525, the second resolution level image data, at a higher resolution than the first resolution level image data is sent. In block 530, a third level header data is sent indicating third resolution level image data will follow, and in block 535, third resolution level image data is sent, being of a higher resolution than the first level or second level image data. Successive levels of image data, each preceded by a header data are sent until the highest resolution level image data is sent.

Successive levels of resolution of image data may be sent, up the maximum resolution obtainable from the source image data. Therefore, the process steps through sending levels 1-M of image data and stops, when the maximum resolution permitted by the source image data has been reached.

The above-described embodiments allow rendering of high resolution vector and text data, on a rendering device having a limited memory area, where a background image is rendered with a resolution that is limited by an available memory capacity or data storage capacity of the rendering device. For example, an architect's drawing may comprise an aerial photograph of a land site, together with an architectural drawing, specified in vector data, plus some text data overlaying the aerial image. The resolution of rendering of the aerial image may be limited by a printer's memory, but the resolution of the architectural drawing and text data are not limited by the memory or data storage capacity of the printer device, but are always printed in very high resolution, for example using the HPGL2 vector graphics language.

The same image data file sent to a different printer or rendering device having a higher memory capacity and/or data storage capacity, may provide a higher resolution background image data, and with vector and text data information at the same resolution as the lower memory capacity/data storage capacity printer device.

What is claimed is:

1. A method for rendering an image using a rendering device, comprising:
    generating a series of data layers that represent the image, each successive data layer providing an increasing resolution of the image;
    transferring one or more of the data layers to the rendering device in response to a memory capacity of the rendering device.

2. The method of claim 1, wherein transferring includes transferring a set of vector data pertaining to the image to the rendering device.

3. The method of claim 1, wherein transferring includes transferring a set of text data pertaining to the image to the rendering device.

4. The method of claim 1, wherein generating includes:
    subdividing the image into a set of sub-images;
    for each sub-image, generating a series of data layers that represent the sub-image each successive data layer providing an increasing resolution of the sub-image.

5. The method of claim 4, wherein transferring includes transferring one or more of the data layers for each sub-image to the rendering device in response to the memory capacity.

6. The method of claim 4, wherein subdividing includes selecting a height of the sub-images in response to the memory capacity.

7. The method of claim 4, wherein transferring includes transferring a set of vector data pertaining to each sub-image to the rendering device.

8. The method of claim 4, wherein transferring includes transferring a set of text data pertaining to each sub-image to the rendering device.

9. The method of claim 1 wherein transferring includes:
    transferring the data layer having a lowest resolution to the rendering device;

transferring a set of vector data pertaining to the image to the rendering device and rendering the image using the data layer having the lowest resolution and the vector data if the memory capacity is not exceeded and rendering the image using only the data layer having the lowest resolution otherwise.

10. The method of claim 1, wherein transferring includes:

transferring the data layer having a lowest resolution to the rendering device;

transferring a set of vector data and a set of text data pertaining to the image to the rendering device and rendering the image using the data layer having the lowest resolution and the vector data and the text data if the memory capacity is not exceeded and rendering the image using only the data layer having the lowest resolution and the vector data otherwise.

11. The method of claim 1, wherein transferring includes:

transferring the data layer having a lowest resolution to the rendering device;

transferring a set of vector data and a set of text data pertaining to the image and the data layer having a next lowest resolution to the rendering device and rendering the image using the data layers having the lowest and next lowest resolutions and the vector data and the text data if the memory capacity is not exceeded and rendering the image using only the data layer having the lowest resolution and the vector data and the text data otherwise.

12. A computer-readable storage medium that stores a program that when executed renders an image using a rendering device by performing:

generating a series of data layers that represent the image, each successive data layer providing an increasing resolution of the image;

transferring one or more of the data layers to the rendering device in response to a memory capacity of the rendering device.

13. The computer-readable storage medium of claim 12, wherein transferring includes transferring a set of vector data pertaining to the image to the rendering device.

14. The computer-readable storage medium of claim 12, wherein transferring includes transferring a set of text data pertaining to the image to the rendering device.

15. The computer-readable storage medium of claim 12, wherein generating includes:

subdividing the image into a set of sub-images;

for each sub-image, generating a series of data layers that represent the sub-image each successive data layer providing an increasing resolution of the sub-image.

16. The computer-readable storage medium of claim 15, wherein transferring includes transferring one or more of the data layers for each sub-image to the rendering device in response to the memory capacity.

17. The computer-readable storage medium of claim 15, wherein subdividing includes selecting a height of the sub-images in response to the memory capacity.

18. The computer-readable storage medium of claim 15, wherein transferring includes transferring a set of vector data pertaining to each sub-image to the rendering device.

19. The computer-readable storage medium of claim 15, wherein transferring includes transferring a set of text data pertaining to each sub-image to the rendering device.

20. The computer-readable storage medium of claim 12, wherein transferring includes:

transferring the data layer having a lowest resolution to the rendering device;

transferring a set of vector data pertaining to the image to the rendering device and rendering the image using the data layer having the lowest resolution and the vector data if the memory capacity is not exceeded and rendering the image using only the data layer having the lowest resolution otherwise.

21. The computer-readable storage medium of claim 12, wherein transferring includes:

transferring the data layer having a lowest resolution to the rendering device;

transferring a set of vector data and a set of text data pertaining to the image to the rendering device and rendering the image using the data layer having the lowest resolution and the vector data and the text data if the memory capacity is not exceeded and rendering the image using only the data layer having the lowest resolution and the vector data otherwise.

22. The computer-readable storage medium of claim 12, wherein transferring includes:

transferring the data layer having a lowest resolution to the rendering device;

transferring a set of vector data and a set of text data pertaining to the image and the data layer having a next lowest resolution to the rendering device and rendering the image using the data layers having the lowest and next lowest resolutions and the vector data and the text data if the memory capacity is not exceeded and rendering the image using only the data layer having the lowest resolution and the vector data and the text data otherwise.

* * * * *